United States Patent Office 3,526,509
Patented Sept. 1, 1970

3,526,509
CAPTURING AND PRESERVING FLAVOR OF ALCOHOLIC BEVERAGES
Masakazu Yamada, Hayashi Komoda, and Fumiyoshi Mano, Tokyo-to, Japan, assignors to Nisshin Sangyo Kabushiki Kaisha, Tokyo-to, Japan, Masakazu Yamada, Hayashi Komoda, and Fumiyoshi Mano, Tokyo-to, Japan
No Drawing. Filed Oct. 20, 1966, Ser. No. 587,956
Int. Cl. C12g 1/00, 3/04
U.S. Cl. 99—30                              1 Claim

ABSTRACT OF THE DISCLOSURE

Flavoring components in a fermentation gas comprising a large amount of carbon dioxide gas are captured by passing the gas through a solvent containing a flavor-sustaining agent. The flavor components are dissolved in the solvent and separated from the fermentation gas.

---

This invention relates to a method for capturing flavor components existing in fermentation gas generated at the time of making alcoholic beverages, and, more particularly, it is concerned with a method for catching the flavor components in the fermentation gas by means either of introducing into a liquid the fermentation gas which is generated together with carbon dioxide gas produced at the time of making alcoholic beverages so as to be dissolved in said liquid for ready obtainment, or of introducing said fermentation gas into a gas cooling apparatus to condense the gas under a low temperature condition so as to capture the fragrant component as a condensed liquid itself.

It has heretofore been considered extremely difficult to capture and pressure fragrance or perfume of alcoholic drinks in its natural state. Many researches and studies have long been continued with a hope that, if this is possibly realized, natural flavor can be imparted to various kinds of alcoholic beverages, drinks, food stuffs, fancy foods, medicines, cosmetics, and so forth by adding an appropriate quantity of such flavor components depending on necessity. However, all these efforts have been in vain. The present invention has successfully solved this long existing problem, and provides a proper and effective method of capturing and preserving natural fragrance or perfume of alcoholic beverages.

It is therefore the object of the present invention to provide a method for obtaining excellent flavor material by capturing in natural state the fragrant or perfuming components such as fusel oil, esters and aldehydes which are usually dispersed in the air simultaneously with enormous quantity of carbon dioxide gas which is generated from mash under fermentation.

The characteristic feature of the flavor material obtained in accordance with the method of the present invention resides in that it does not have an unnatural odor or scent as in synthetic flavors for the reason that it is the natural flavor obtained during the making of alcoholic beverages, that it is perfectly nontoxic, and that it can be safely used as an additive flavor for all kinds of alcoholic beverages, drinks, food stuffs, fancy foods, medicines, cosmetics, and other wide varieties of assortment, or as the base material for perfumery.

The foregoing object and other objects of the present invention will become more clearly understood from the following description.

According to the present invention, there is provided a method for capturing flavor components in alcoholic beverages which is characterized in that fermentation gas generated at the time of making alcoholic beverages is introduced into a liquid so as to dissolve out said flavor component to be captured in said liquid.

According to another aspect of the present invention, there is provided a method for capturing flavor components in alcoholic beverages which is characterized in that said fermentation gas is introduced into a gas condenser, and is cooled and condensed at a temperature lower than the condensing and liquefying temperature of said flavor component, but higher than the liquefying temperature of carbon dioxide gas.

The present invention produces a flavor material by means either of introducing into a condensing part the fermentation gas which is generated at the time of making "sake," flavoring liquid for synthetic "sake," beer, wine, apple wine, whisky mash, rum mash, soy bean sauce mash, etc., where the gas is caused to pass through the liquid to dissolve out the flavor component therein, or directly condensing the fermentation gas at a temperature below the condensing and liquefying temperature of the flavor material, thereby capturing it in a liquefied state.

In the case of capturing the fragrant component by dissolving the same into a liquid, the solvent to be used should preferably be non-toxic in consideration of general use, for which water, ethyl alcohol, glycerine, or propylene glycol, per se or a mixture prepared by combining any of these substances such as, for example, 20 percent of water and 80 percent of alcohol, or the same mixture added with a small amount of glycerine or propylene glycol is deemed to be the most suitable. Also, in this case, it is possible to capture the flavorous component without using a solvent. This can be done by keeping the flavor component dissolved directly in liquid products such as, for example, beer, synthetic beer, soft beer, whisky, "sake," synthetic "sake," liqueur, wine, brandy, soft drinks, etc., after the fermentation gas is introduced into these products.

Furthermore, when it is desired to obtain flavor component without using any kind of solvent whatsoever, a method, wherein the fermentation gas generated at the time of making alcoholic beverages is introduced into a gas condenser, and then it is cooled and condensed into a liquid containing the flavor component which is used as the liquid for extracting and capturing the flavor material, will sufficiently attain the purpose as will be described hereinafter in more detail.

For seizure of the flavor component in using a liquid, the steps of introducing into the solvent the fermentation gas generated at the time of making alcoholic beverages, and of dispersing in the liquid the flavor component together with carbon dioxide gas present in large quantity would result in leaving the flavor component alone in the solvent, said carbon dioxide gas being eventually scattered and lost. However, the rate of yield of this flavor component is greatly affected by the constituent of the solvent, the temperature at whicht he flavor component is extracted, manner of dispersing the fermentation gas into the solvent, and so on. Particularly, since the temperature inevitably governs the vapour pressure of the flavor component, the temperature of the liquid should at least be lower than that of the fermentation gas. For example, when 80% alcohol is used, the temperature thereof should preferably be kept in the range of 5 degrees C. to −25 degrees C., and, in case of using 5 percent aqueous solution of glycerine, the temperature range of 5 degrees C. to 0 degrees C. should be desirably maintained. In order to sustain the flavor component in the liquid, a flavor sustaining agent such as, for example, ethyl palmitate, ethyl stearate, or phenyl ethyl alcohol can be added beforehand in the solvent, whereby the rate of capturing the flavor component becomes improved, and the captured flavor is not easily scattered and lost even if the solvent is reinstated to the normal temperature.

For the capture and preservation of flavor in "sake" and synthetic "sake," the following measures are proposed. A hermetically sealed tank is used for fermentation of mash of "sake" or mash of flavoring liquid for synthetic "sake" (same as the mash of "sake"), wherein fragrance or aroma, which is included in and dispersed with carbon dioxide gas to be generated according as the alcoholic fermentation in the mash becomes gradually enhanced, is, at the time just before and after the highest foaming stage where the fragrance is most vigorously dispersed, sent bubbling into a plurality of vessels arranged in series at several stages containing a flavor absorbing liquid prepared by mixing one or more kinds of water, alcohol, glycerine, propylene glycol, or beverages with help of pressure of carbon dioxide gas by way of conduit pipes led from the upper surface of the fermentation tank into the vessel containing the abovementioned liquids. Thus, the flavor component is captured in the liquid and, at this time, the liquid is cooled down to an extreme degree by a freezing mixture, depending on necessity, so as to preserve the fragrance in the liquid.

In the case of beer, the flavor can be captured and maintained in the same manner as mentioned in the above at the time when the excess carbon dioxide gas generated at fermentation in the closely sealed vessel is discharged outside. In the case of mash of soy bean sauce, a brewing tank with the top open is covered and closely sealed, and then the flavor dispersed with carbon dioxide gas generated at the alcoholic fermentation is captured and maintained in the same manner as aforedescribed.

Similarly, by utilizing a closely sealed vessel at the time of fermentation, the flavor component can be captured from wine, apple wine, whisky mash, and rum mash by bubbling into a plurality of vessels containing a solvent or a beverage which are arranged in series at several stages and cooled down to 5 degrees C., a fermentation gas by way of conduit pipe lines led from the upper surface of the fermentation vessel into the respective vessels containing solvent or beverage with help of pressure of carbon dioxide gas, when the alcoholic fermentation becomes most vigorous.

The way of directly condensing the fermentation gas by inducing it into a gas condenser according to the present invention is included in the general idea of capturing the flavor component in the fermentation gas. This method is excellent in respect that it is capable of capturing the natural flavor along with moisture and alcohol present in the fermentation gas without using any other solution such as a solvent or a beverage whatsoever, thereby obtaining a flavor material with no apprehension of foreign substance to be mixed.

Explaining in more detail, the fermentation gas to be generated in the fermentation vessel is led into a gas cooling device, wherein the fermentation gas is sufficiently cooled at a temperature lower than that for condensation and liquefaction of ethyl alcohol, fusel oil, esters as well as aldehydes, which are all flavor components, but higher than the liquefying temperature of carbon dioxide gas, thereby capturing the flavorous component as a condensed liquid. While this method requires power for cooling the fermentation gas to a temperature range of 30 degrees C. to −60 degrees C., generally to about −20 degrees C., which is not necessary in the case of capturing the flavor component through the medium of a liquid, it has remarkable advantages such that the flavor component dispersed together with carbon dioxide gas to be generated in large quantity by fermentation in the course of making alcoholic beverages is separated from carbon dioxide gas in substantially its entire quantity to become a condensed liquid which is a highly concentrated flavoring solution having high natural aroma, and, moreover, which is the flavor component itself not containing any solvent whatsoever with the consequence that it can be freely and safely added to articles which do not admit mixing of alcohol.

As described in the foregoing, the method of the present invention captures and maintains natural flavors to be dispersed at the time of fermentation to make alcoholic drinks by dissolving the fermentation gas into a stable solvent. On account of this, the natural flavor can be captured and maintained extremely economically and efficiently, and the products to which this natural flavor can be added are full of varieties such as alcoholic drinks of all kinds, beverages, food stuffs, fancy foods, medicines, cosmetics, etc.

With a view to leading persons skilled in the art to possible reduction into practice of the present invention, the following actual examples are presented, but the invention is apparently not limited to these examples only.

Example 1

5 kilolitres of mash of "sake" is charged in a tank of enamel ware having a capacity of 9 likolitres. When the foaming of the mash is about to move from its maximum degree to a diminishing tendency, the tank is covered and hermetically sealed, and then the generating carbon dioxide gas is bubbled out into vessels containing 10 litres of a flavor absorbing liquid prepared from 80% alcohol, and arranged in series at three stages by way of conduit pipe lines. The vessels containing the flavor absorbing liquid are kept at a temperature below 5 degrees C. by a freezing mixture. In this manner, the flavor was absorbed into the liquid for two consecutive days, and the liquid, in which the flavor component is captured, was stored in a cold dark place in a hermetically sealed condition. The flavor liquid thus obtained possesses the flavor of the "sake" of the best quality.

Example 2

5 kilolitres of whisky mash was charged in a hermetically sealed tank of 10 kilolitres, and fermentation gas generated a little before the fermentation reaches its climax is sent bubbling out by the help of carbon dioxide gas into 2 litres of a solution composed of 20 percent of water, 79 percent of alcohol, and 1 percent of glycerine, and dissolved. The solvent was kept cooled at 3 degrees C. and the flavor is captured for 3 consecutive days. The flavor liquid thus obtained was hermetically sealed and stored in a dark, cold place. This flavor liquid possesses a fragrance of whisky which has long been preserved.

Example 3

A fermentation tank containing 5 kilolitres of "sake" mash is closely sealed and the fermentation gas generated therefrom is led into a gas condenser. The gas condenser used in this case possesses the capability of cooling the fermentation gas, at 15 degrees C. and flowing thereinto at a rate of 18 litres per minutes down to −20° C. After, lapse of 48 hours, 1.3 litres of condensed liquid containing 61% of ethyl alcohol, 0.513% of fusel oil, 0.492% of ester, and 0.026% of aldehyde is obtained. The flavor liquid thus obtained has the strong scent of "sake."

Example 4

5 kilolitres of rum mash is charged in a closed fermentation tank having capacity of 10 kilolitres. As soon as fermentation activity reaches its climax, the fermentation gas generated therefrom is led into a gas condenser. The gas condenser used for this purpose has the capability of cooling the fermentation gas, at 15 degrees C. and flowing at the rate of 18 litres per minute down to −20 degrees C. After, lapse of 48 hours, 1.4 litres of condensed liquid having a good scent of rum is obtained. This condensed liquid is again brought to the outlet pipes for fermentation gas in a separate fermentation tank, in which the fermentation of rum mash is at its climax, in three stages, so that the fermentation gas is sent bubbling into the condensed liquid for two days, thereby obtaining flavor liquid having a stronger scent of rum. This flavor

What we claim is:

1. A method for capturing a flavor component, in fermentation gas containing the component and a large amount of carbon dioxide gas and generated at the time of manufacturing a beverage selected from the group consisting of sake, flavoring liquid for synthetic sake, beer, wine, apple wine, whiskey mash, rum mash, and soybean sauce mash, said method comprising the steps of introducing and dispersing the fermentation gas into a non-toxic liquid solvent suitable for dissolving the flavor component and selected from the group consisting of water, ethyl alcohol, glycerine, and propylene glycol and mixtures thereof; discharging the carbon dioxide gas from said liquid solvent during dispersion of the fermentation gas in said liquid solvent; maintaining the temperature of said liquid solvent lower than the temperature of the fermentation gas; and adding, to the liquid solvent and before introducing the fermentation gas thereinto, a flavor-sustaining agent selected from the group consisting of ethyl palmitate, ethyl stearate, and phenyl ethyl alcohol, to improve the efficiency of capture of the flavor component.

References Cited

UNITED STATES PATENTS

| | | | |
|---|---|---|---|
| 2,103,449 | 12/1937 | Crutchfield et al. | 99—34 |
| 2,536,994 | 1/1951 | Cremaschi | 99—35 |
| 3,087,822 | 4/1963 | Smith et al. | 99—36 X |

OTHER REFERENCES

Clerck, J. D.: A Textbook of Brewing, vol. 1, Chapman and Hall, London, 1957 (pages 426–427).

Chemicals Used In Food Processing, National Academy of Sciences—National Research Council, publication 1274, Washington, D.C., 1965 (pp. 121 and 174).

A. LOUIS MONACELL, Primary Examiner

D. M. NAFF, Assistant Examiner

U.S. Cl. X.R.

99—31, 34, 35